United States Patent [19]
Butler et al.

[11] Patent Number: 5,269,016
[45] Date of Patent: Dec. 7, 1993

[54] BYZANTINE RESILIENT FAULT TOLERANT SHARED MEMORY DATA PROCESSING SYSTEM

[75] Inventors: Bryan P. Butler, Arlington; Richard E. Harper, Needham, both of Mass.

[73] Assignee: Charles Stark Draper Laboratory, Inc., Cambridge, Mass.

[21] Appl. No.: 586,800

[22] Filed: Sep. 24, 1990

[51] Int. Cl.⁵ .............................................. G06F 11/00
[52] U.S. Cl. ................................... 395/575; 371/11.3; 371/36
[58] Field of Search ................. 371/36, 11.3; 395/575; 364/268.4, 268.5, 268.9, 269.1

[56] References Cited

U.S. PATENT DOCUMENTS

| | | | |
|---|---|---|---|
| 4,239,982 | 12/1980 | Smith et al. | 307/219 |
| 4,907,232 | 3/1990 | Harper et al. | 371/36 |
| 4,937,741 | 6/1990 | Harper et al. | 364/200 |
| 4,979,191 | 12/1990 | Bond et al. | 375/108 |
| 4,984,241 | 1/1991 | Truong | 371/36 |

*Primary Examiner*—Charles E. Atkinson
*Attorney, Agent, or Firm*—Robert F. O'Connell

[57] ABSTRACT

A fault tolerant data processing system which provides single fault Byzantine resilience which system uses a number of fault containment regions each of which includes at least one processing element. The fault containment regions of the system are arranged to utilize a shared memory, each of such regions including a portion of the shared memory. The shared memory portion of each fault containment region provides communication with the shared memory portions of each of the other fault containment regions. A shared memory portion includes an encoder for encoding a data byte from the processor in the region into a number of data byte symbols from which the data byte can be reconstructed. The data byte symbols can be stored in the shared memory portion of the region and can be transmitted to one or more of the shared memory portions of the other fault containment regions.

7 Claims, 5 Drawing Sheets

BYZANTINE RESILIENT FAULT TOLERANT SHARED MEMORY DATA PROCESSING SYSTEM

INTRODUCTION

This invention relates generally to Byzantine fault-tolerant data processing systems and, more particularly, to such systems which utilize encoded data handling techniques to permit such systems to operate with memories of reduced size while still retaining the system's Byzantine resilient performance and providing a relatively fast recovery time following transient faults.

BACKGROUND OF THE INVENTION

This invention was made with Government support under contract NAS1-18565 awarded by NASA. The Government has certain rights in this invention.

Byzantine resilient data processing systems have been described in the art, one such system being described for example, in U.S. Pat. No. 4,907,232, issued to R. Harper and J. Lala on Mar. 6, 1990. In such a system groups of redundant components are utilized in separate fault containment regions (FCRs), sometimes also referred to as fault containment channels or lanes, which regions are electronically and physically isolated from each other. Thus, the failure of a component within one FCR may cause the failure of other components in the same FCR but such failure cannot induce faults in the other FCRs. Moreover, erroneous behavior in one FCR cannot cause the aggregate of FCRs to exhibit erroneous behavior.

Error propagation can occur, however, in such a system when a faulty FCR transmits its faulty data to another FCR. If a functional FCR receiving such data does not react thereto as other functioning FCRs, such recipient FCR may appear faulty. Fault masking techniques, i.e., data voting techniques, are used to prevent faulty data from degrading the operation of one or more functioning FCRs, an FCR receiving redundant data from other FCRs and applying such fault masking techniques thereto to mask a given number of erroneous data items. Accordingly, such a system maintains its functionality even in the presence of Byzantine failures.

It has been found that such a Byzantine resilient system can tolerate the loss of F fault containment regions under the following conditions: (1) if (3F+1) FCRs are utilized, (2) if each FCR is connected to at least (2F+1) other FCRs by disjoint communication links or paths, (3) if (F+1) rounds of data exchange are used to distribute single-source data, and (4) if the operations of functioning FCRs of the system are time synchronized to within a known and specified time skew. Thus, for a single-fault tolerant system where (F=1), four FCRs are utilized, each FCR being connected to each of the other three FCRs and two rounds of data exchanges being used to distribute single-source data.

As the requirements of such systems are increased because of desired increases in the functionality and operating system requirements thereof, it has been found that the memory size requirements of such systems are also significantly increased. Increased memory size has a negative effect on both the reliability and the cost of the system, as well as reducing the ability of the system to reintegrate FCRs into system use after a transient fault occurs therein, the time required to reintegrate an FCR normally being dominated by memory realignment time.

It is desirable to provide a Byzantine resilient fault tolerant system in which memory size requirements can be reduced as compared to such requirements in currently proposed systems. It is especially important that such systems remain ulta-reliable with respect to single-source data, sometimes referred to as the "source-congruency" requirement, in order to maintain Byzantine resilience.

BRIEF SUMMARY OF THE INVENTION

In accordance with the invention, a fault tolerant system generally based on Byzantine resilient data processing systems using multiple, fault containment regions, as described, for example, in the aforesaid Harper and Lala patent is utilized. In contrast with such known systems, the fault containment regions of the invention are arranged so as to utilize a shared, encoded data memory system. Thus, in a known quadruplex fault tolerant system using four FCRs and a memory storage size of 4n, where n is the data width (i.e., the data byte size), the use of a shared memory system utilizing a suitable data encoding/decoding technique reduces the memory size requirements by one-half, i.e., a storage size of 2n, thereby increasing the reliability while decreasing the cost of the system. Further, in known quadruplex fault tolerant systems, for example, a single, transient (i.e., "soft") error is normally corrected when detected as during a read operation, that requires time for the memory to recover, i.e., to be re-aligned, before it is ready for further use. In contrast, in accordance with a shared, encoded data memory operation of the invention, a single, transient error in a quadrant of the shared memory need not be corrected at the time it is detected since the information contained in the remaining three quadrants is sufficient to provide the correct value. The error can then be corrected later upon a subsequent read operation of the shared memory designated for that purpose, (i.e., during a memory "scrubbing" operation), the faulty memory quadrant in a particular FCR not requiring a correction and realignment at the time detection occurs since such quadrant need not be reintegrated into the overall system at that time.

Further, the system hardware, designed to provide the memory scrubbing operation, prevents an accumulation of transient errors in the shared memory by the use of such hardware controlled, background error scrubbing technique (i.e., a background error detection and correction technique). By using a hardware implemented scrubber, the scrubbing cycle time and, therefore, the memory fault latency can be automatically controlled to be upper-bounded at a relatively small value so that the reliability of the memory system is further increased.

One encoding/decoding technique that has been found useful in such a quadruplex, shared memory, fault tolerant system, for example, is that known in the art as a (4,2) linear separable code previously suggested for providing informational redundancy in other contexts, as described in the article "The '(4,2) Concept' Fault Tolerant Computer", by T. Krol, 12 International Symposium on Fault Tolerant Computers; June 1982. While such encoding techniques have not heretofore been usable to fulfill the source congruency function of FCR specific or single source, data, the invention described herein successfully adapts such encoding techniques for use in order to achieve the desired source congruency and, thus, provide Byzantine resiliency in a multiple FCR system.

DESCRIPTION OF THE INVENTION

The invention can be described more specifically in accordance with the accompanying drawings wherein.

Figure 1:
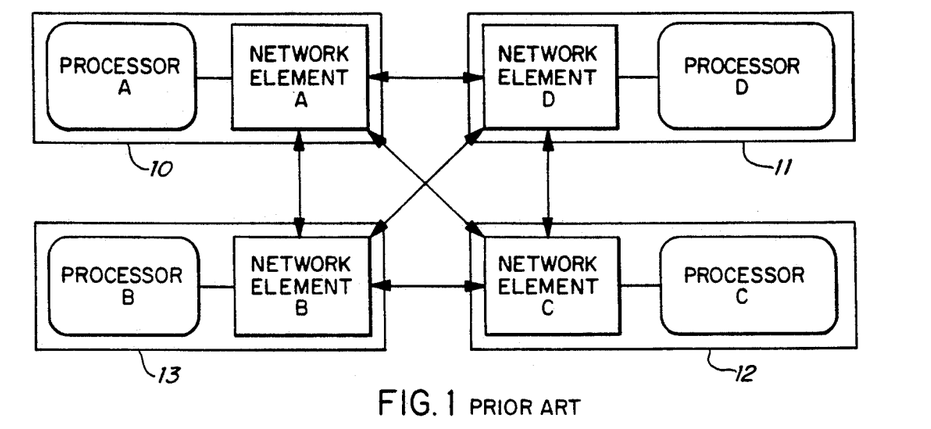
FIG. 1 shows a block diagram of a known Byzantine resilient fault tolerant data processing system.

FIG. 1 depicts a block diagram of a known Byzantine resilient fault tolerant data processing system such as described in the aforesaid Harper and Lala patent. As seen therein, the system comprises four fault containment regions 10, 1, 12, and 13, each region having its own processor, memory, voter units, etc. and being physically and electrically isolated from each other fault containment region. Each FCR communicates with each other FCR via a network element contained therein as explained in the aforesaid patent.

Figure 2:
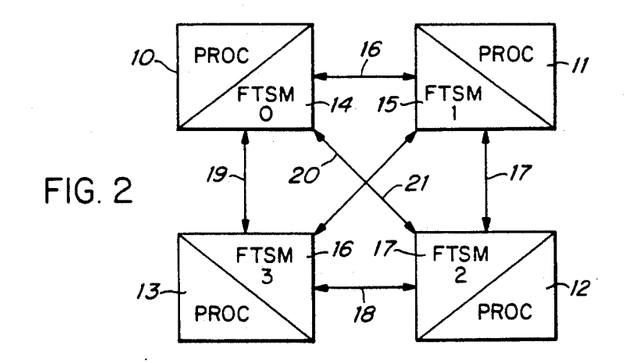
FIG. 2 shows a block diagram of a particular embodiment of the invention using a shared memory system.

In accordance with the invention, the system is redesigned to use a shared memory system as shown diagrammatically in FIG. 2. The overall memory is distributed among the fault containment regions 10-13 as shown by the four shared memory portions shown as memory quadrants 14, 15, 16 and 17, the physical and electrical isolation of each shared memory quadrant from each other shared memory quadrant being preserved. In the embodiment described one or more processing elements are used in each FCR, which processor, or processors, has access both to its own shared memory quadrant and to each other shared memory quadrant as shown by the arrowed data transfer paths 16-21 depicted therein. In effect, the shared memory quadrant of each FCR acts as the network element in the previously described system since it contains components required to effect data transfers to and from other FCRs, as discussed more fully below.

In the system as shown, where each memory portion represents a quadrant of the shared memory, the loss of any memory quadrant will not cause either a loss of data in, or a loss of functionality of, the entire system. Three memory quadrants contain sufficient information to reconstruct all data values, as also discussed more fully below.

The memory system of FIG. 2 meets the above discussed requirements for single fault Byzantine resilience (i.e., where $F=1$), since four memory quadrants are used, each in a separate FCR, and an inter-FCR communication system connects each memory quadrant to each other memory quadrant via ($2F+1$) communication links. A source congruency write or read operation can be performed by such system so as to retain Byzantine resilience, as explained below. Moreover, a fault-tolerant clock (FTC) signal can be distributed via the communication links to fulfill the time skew synchronization requirements in substantially the same manner as is done in the previous system on which the system of the invention is based.

Figure 3:
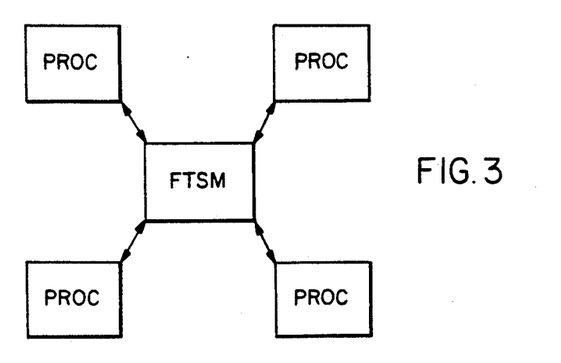
FIG. 3 shows an alternative block diagram of the invention of FIG. 1 which is helpful as a programming model thereof.

The fault tolerant shared memory (FTSM) system of FIG. 2 can be viewed as one in which a processing element is connected to the shared memory quadrant in each FCR, the shared memory quadrants all being suitably interconnected for communication with each other. Such viewpoint is shown in another virtual diagrammatic form in FIG. 3. Such virtual model of the system can be used by a programmer as a programming model of the system. All processors of the FCRs can read a value from any location in any memory quadrant no matter in which FCR such memory quadrant is physically present.

A data word to be stored in the shared memory is encoded by using, for example, a (4,2) encoding scheme discussed above. While such an encoding system is preferred for use in the embodiment described herein, such an encoding scheme can be extended to use any other (n, k) encoding scheme using n FCRs, e.g., an (8,4) scheme using 8 FCRs, etc., can be used as would be known to the art. Such a (4,2) encoding process takes two 4-bit symbols which represent an 8-bit data byte and generates four 4-bit symbols therefrom. Each FCR stores a different one of the four symbols so that, in accordance with such encoding scheme, if a data byte symbol stored in one FCR is lost, each data byte can be reconstructed from the remaining three symbols. So long as only a single symbol is lost in each data byte, the data word can be reconstructed. The encoding/decoding implementation matrix for such an encoding scheme is well-known in the art, as described in the aforesaid Krol article, and need not be described in further detail here.

The system of the invention further requires a fault masking function so that, in the presence of faults, an FCR can resolve redundant information from multiple FCRs into a single value. Such fault masking function should be deterministic, i.e., separate masking function instances on different FCRs should provide the same result given identical input values.

Figure 4:
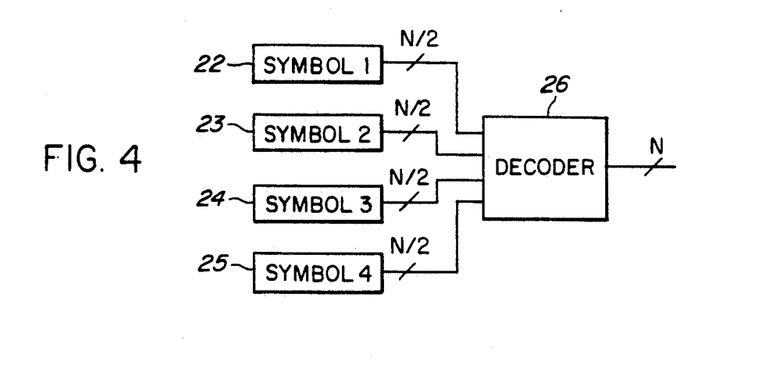
FIG. 4 shows a block diagram of a decoding technique of the invention.

Conventional fault masking techniques use nominally identical copies of data having specified data widths in which redundant copies are resolved by a majority vote using suitable voter units. Such techniques require memory storage sizes of an order of at least 3n (in the system shown in FIG. 1, for example the memory storage size will be on the order of 4n) with a communication band width of the order n. By using a (4,2) encoding scheme in the system of the invention, an encoder generates, from a data byte, four symbols in order to provide a functional redundancy thereof. Each symbol is stored in a separate memory quadrant of a different FCR. A decoder uses the four symbols to regenerate the data byte, there being sufficient information from three symbols to do so even if one symbol is corrupted. As shown in FIG. 4, in accordance therewith, a data byte of size n can be stored as four symbols, each of a size n/2, only three symbols being needed to decode the symbols so as to recover the data byte. The resulting storage requirements are of the order of 2n and the communications bandwidth is of the order n/2.

Thus, the use of an encoded, fault masking function as shown in FIG. 4 differs from the conventional vote fault masking function of previously known Byzantine resilient systems using isolated FCRs. Because of such differences, interchannel information exchange operations are not the same as those used in such prior known non-encoded, non-shared, memory systems and new information exchange operations using encoded symbols must be devised, particularly when handing single source data so as to satisfy the desired source congruency, requirement for Byzantine resiliency. For such purpose it has been determined in accordance with a quadruplex implementation of the invention, for example, that, following a symbol exchange operation, at least one of the following two conditions must be met:

1. All functioning FCRs must agree on three of the four symbols and these three agreed-upon symbols map (i.e., are decoded) to a valid code word; or
2. All functioning FCRs must agree on the value of all four symbols.

Figure 5:
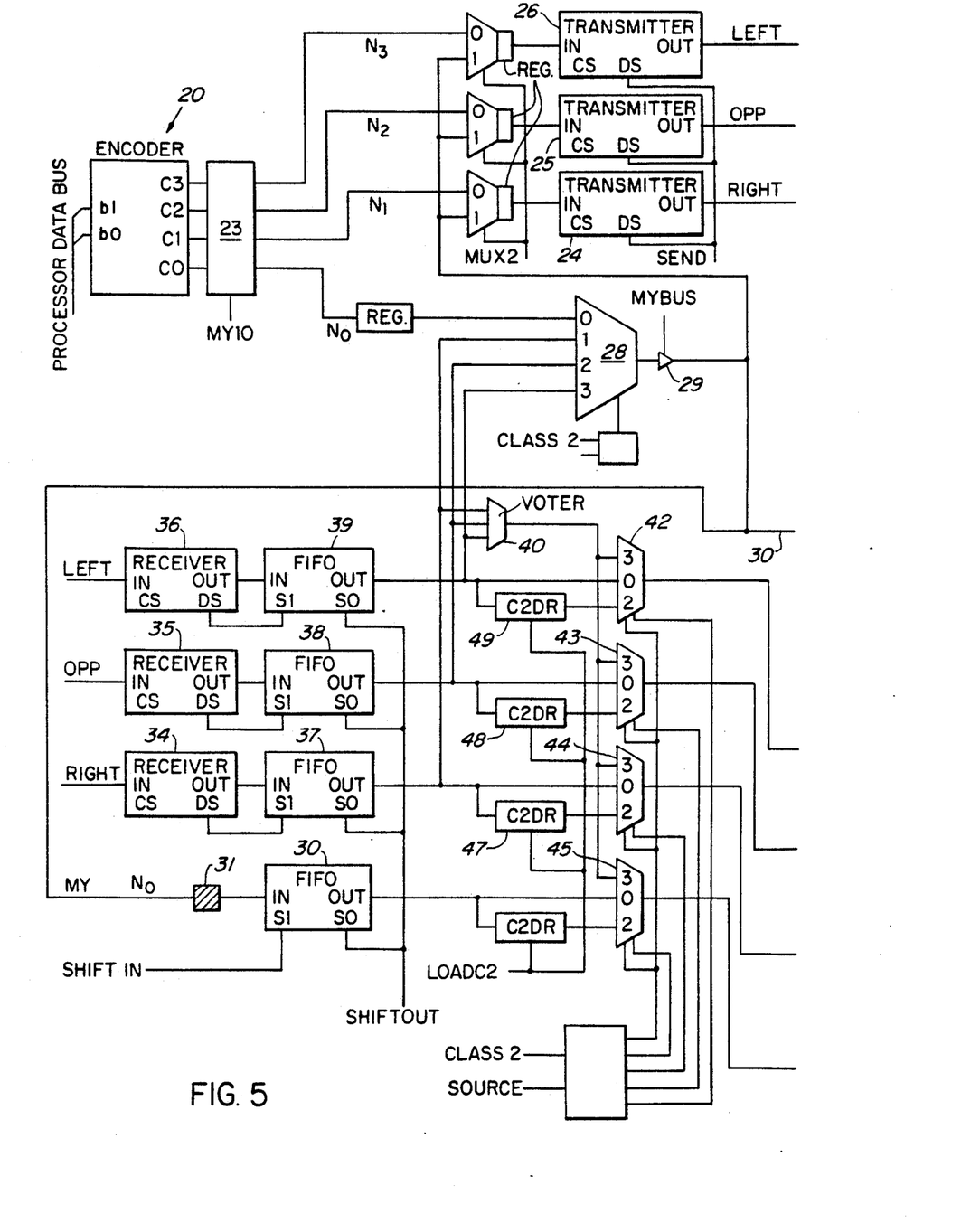
FIGS. 5A, and 5B show more detailed block diagrams of an exemplary embodiment of a shared memory quadrant of the system of the invention.
Figure 5A:
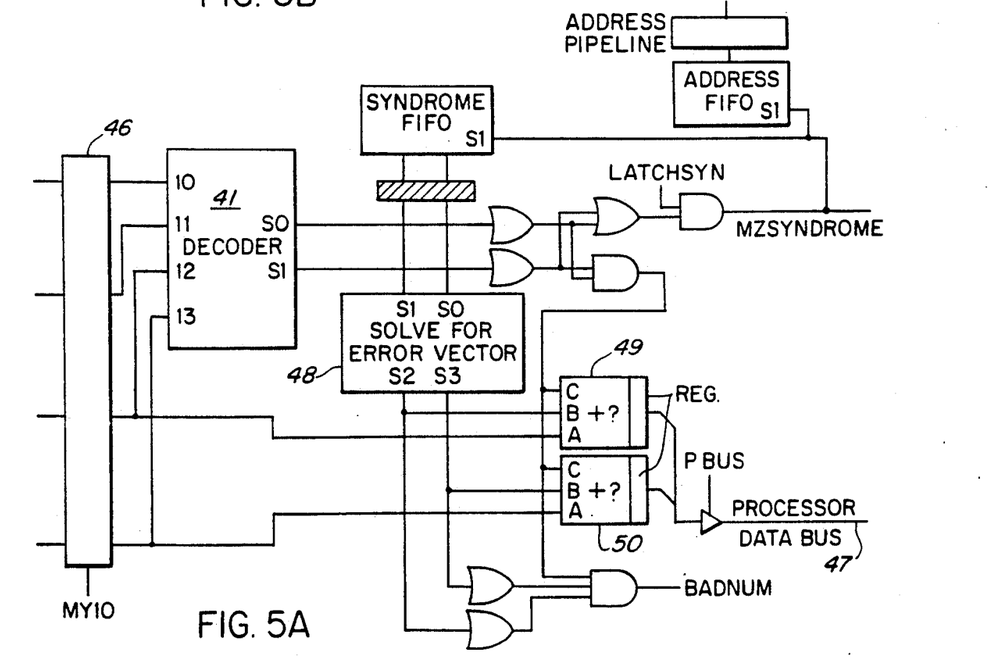
Figure 5B:
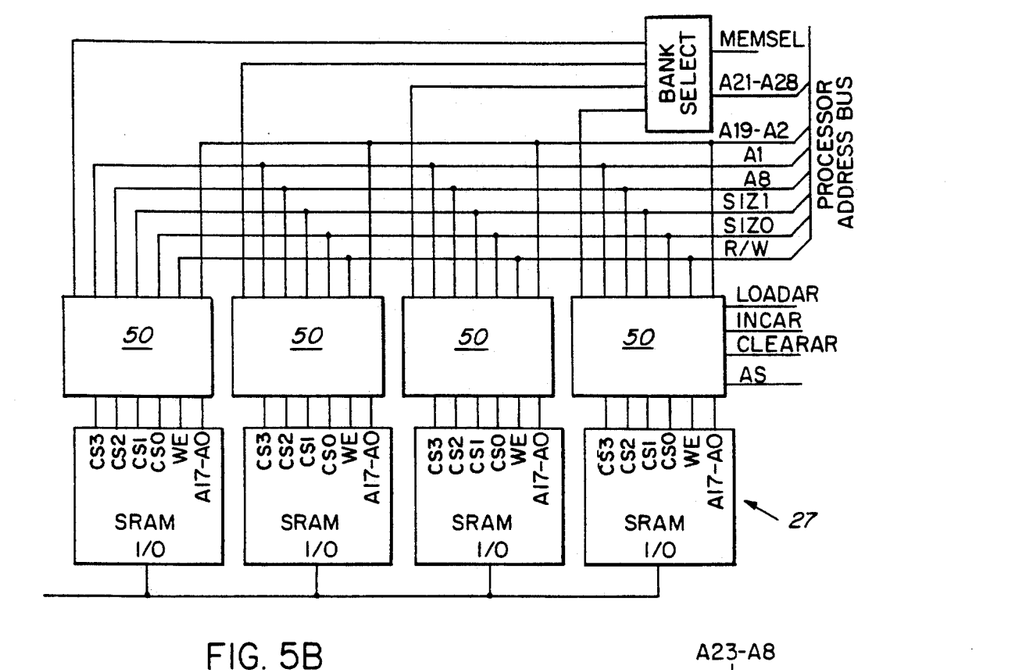

A specific implementation of a typical fault tolerant shared memory quadrant and the data paths therein, as used in each FCR for providing an operation which satisfies the source congruency requirement in accordance with the invention, is shown in FIGS. 5 and 5A. The required write and read data exchanges for single source data operations are depicted diagrammatically in FIGS. 6 and 6A which show the write and read data exchange operations, respectively. Such data exchange operations are initially described in a general manner below with respect to FIGS. 6 and 6A and the handling thereof in a specific memory quadrant circuit implementation is then discussed with reference to FIGS. 5A and 5B.

Figure 6:
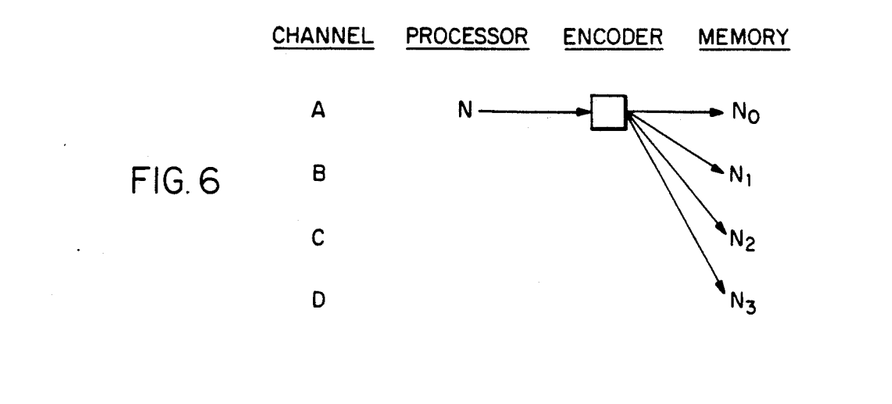
FIGS. 6 and 6A show diagrams of write and read data exchanges for single source data operation in the system of the invention.

In a write data exchange, the single-source FCR which distributes a data byte N generates all four symbols $N_0$, $N_1$, $N_2$ and $N_3$ from the data bye during the encoding process, as seen in FIG. 6. One of the symbols $N_0$ is stored in the original FCR's local memory quadrant, while the other three symbols $N_1$, $N_2$, $N_3$ are distributed to the other three FCRs for storage in their local memory quadrants, respectively.

One of the constraints imposed on a single source data read operation in a Byzantine resilient, single fault tolerant system, as described in the aforesaid Harper and Lala patent, in that two rounds of exchange are necessary to guarantee consistency. A fault tolerant shared memory system in accordance with the invention imposes an additional constraint which requires an additional exchange round. This constraint is required by the decoder, which requires four symbols to reconstruct the data byte, given that one of the symbols may be erroneous (i.e., a single fault condition).

In a conventional voting scheme, only three data copies are required to determine an unambiguous majority in the presence of a single error. Since the decoder, when used with a shared memory system, requires four symbols, the data source symbol must be included in the overall exchange. If the source FCR is merely allowed to broadcast its symbol to the other FCRs during the second round, such a procedure would cause data from the source processor to carry extra weight during the fault masking operation as compared to the other processors. If the source FCR is maliciously failed, it could broadcast symbols to the other functioning FCRs which would cause them to reach different conclusions regarding the validity of the data. Such indecision can cause divergence and, therefore, catastrophic loss of the entire system. Accordingly, a different approach is required for such a single source read operation, in accordance with the invention.

Figure 6A:
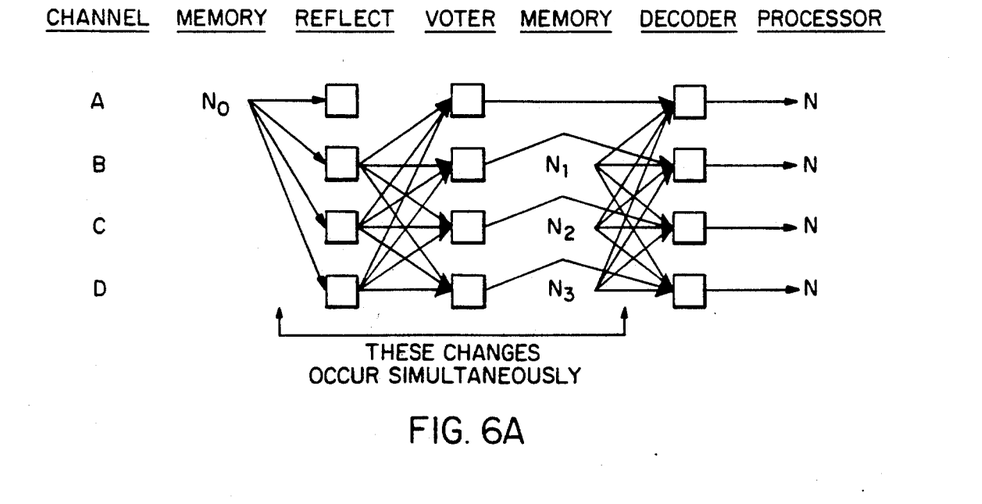

In such approach, the source symbol $N_0$ is distributed among recipient processors and a vote function is used to ensure data consistency, as shown in FIG. 6A. The first data exchange round shown therein distributes the symbol $N_0$ from the source FCR to all other recipient FCRs. During the second data exchange round, the other recipient FCRs exchange and vote the value of $N_0$, thus ensuring that all functioning FCRs reach agreement on the value of $N_0$ Essentially, these two exchanges are in effect comparable to known source congruency read operations which can then be interleaved within the shared memory system single source data exchange of the invention, as discussed below.

During a third exchange round, as shown in FIG. 6A, the symbols $N_1$, $N_2$, $N_3$ stored by each recipient, non-source FCR, respectively, are exchanged. These symbols originated from the source FCR during the write operation, so validity is not assured. Agreement, however, is assured because, if the source FCR is faulty, and only one fault is assumed to exist in the system at a time, i.e., $F=1$, all of the recipient FCRs are assumed to be non-faulty and will, therefore, forward consistent copies of their respective symbols. In the context as used herein, the term "validity" is intended to mean that all functioning channels or FCRs receive the correct value from the single function source (i.e., a non-failed source). The term "agreement" is intended to mean that all functioning channels or FCRs receive the same value, not necessarily a correct (valid) value from the source which may be non-functioning.

Accordingly, at the end of the third round, each functioning FCR has a consistent value for each of the four code symbols, so that, when decoding occurs, they are all able to reach agreement on the value N, as shown. It should be noted that the first and third exchange rounds use mutually exclusive data paths. Since the third round is not dependent upon the results of the first round, these two rounds can be performed simultaneously.

FIG. 5 shows a specific implementation of a typical memory quadrant found in each FCR which implementation provides for the desired data exchange operations for a source congruent (single data source) data exchange. Unit 20 therein is an encoder for encoding input data from a processor in accordance with a (4,2) encoding scheme.

During a source congruent write data exchange (FIG. 6), the encoder 20 of the data source memory quadrant provides four symbols ($N_0$, $N_1$, $N_2$ and $N_3$) at the output of the encoder, three of which ($N_1$, $N_2$, $N_3$) are supplied via unit 23 to three transmitter circuits 24, 25, 26 for supplying $N_1$, $N_2$ and $N_3$ to the memory quadrants of the other three FCRs, respectively, e.g., to the right, opposite, and to the left of the data source FCR respectively. In addition, the symbol $N_0$ is stored in the source FCR's own memory units (SRAM units 27) via register unit 28, bus driver unit 29 and internal data bus 30.

During a source congruent read data exchange (FIG. 6A), in a first round thereof the source memory quadrant supplies its stored symbol $N_0$ from its SRAM memory unit 27 to a FIFO (first-in-first-out) register 30 via a buffer unit 31. The $N_0$ symbol is not shifted out of FIFO register 30 since it is not thereafter used, as can be seen in FIG. 6A. During such first round, however, each other FCR receives $N_0$ from the source FCR via an appropriate one of the source transmitters 24, 25, 26 and via an appropriate one of the recipient FCR's receivers 34, 35, 36. The received $N_0$ at each other FCR memory quadrant is placed in the corresponding FIFO register 37-39 from where it can be subsequently shifted out.

During the second round each of other (non-source) FCRs supplies its received $N_0$ to each of the other FCR's including the source FCR. For such purpose, the received $N_0$ in each other FCR memory quadrant is shifted out of the FIFO where it was stored and is supplied to transmitters 24, 25, 26 via unit 28. Each of the three non-source FCRs receives $N_0$ values from the other two non-source FCRs (via the appropriate ones of its receivers 34, 35, 36) and stores $N_0$ in the corresponding FIFO register, which values are then shifted out of the FIFO to voter unit 40 for voting, as shown FIG. 6A.

In addition, the source FCR receives $N_0$ values from each of the other non-source FCRs and in a similar manner votes such values in its voter unit 40. The voted values are then supplied in each FCR to its own decoder unit 41 via units 42-45 and unit 46.

During the third round, the $N_1$, $N_2$, $N_3$ values stored in each non-source FCR during a write operation are supplied to all other FCR's (including the source FCR) by being accessed from the RAM memory unit 27 of each FCR and supplied to transmitters 24, 25, 26. Such $N_1$, $N_2$ and $N_3$ values are received at each FCR (including the source FCR) via receivers 34, 35, 36 and FIFO registers 37-39 and temporarily stored in registers 47-49 after being shifted out of the FIFOs. Such data exchange round can be performed simultaneously with the first round exchange since such exchanges use mutually exclusive data paths.

Following the second and third exchange rounds, the decoder 41 in each FCR memory quadrant decodes the four symbols supplied thereto from registers 47-49 via units 42-45 and unit 46. The decoding operation (in effect an operation which uses the inverse matrix of that used in the encoder operation) reconstructs the data byte N for supply from the decoder output to the processor data bus 47 via unit 48 and units 49-50, to complete the decoding operations, as shown in FIG. 6A.

Figure 7:
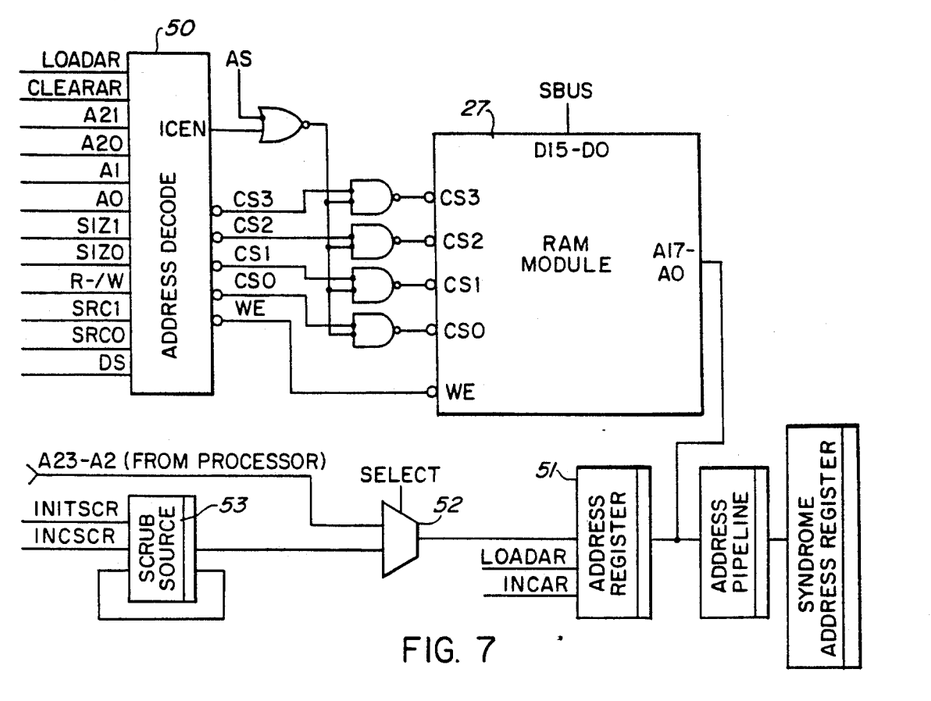
FIG. 7 shows a more detailed block diagram of units associated with the RAM memory module of FIGS. 5 and 5A helpful in understanding the detection and correction of transient errors in the system of the invention.

In order to reduce the probability of uncorrectable transient errors from accumulating in a memory location, the system in accordance with the invention, further includes a hardware controlled memory scrubber for detecting and correcting transient errors in all memory locations. The operation thereof can be understood by considering FIGS. 5 and 7.

As can be seen in FIG. 5 each RAM unit 27 is supplied with an appropriate decoded address from a address decoder 50 specifying a memory location being accessed. As shown more specifically in FIG. 7, the inputs which identify the position of the RAM module 27 to which the address bits are to be supplied are provided to the address decoder 50. The address bits are received either from an address register 51 which is latched with the address bits as presented thereto either from a processor via address selection logic unit 52 or from an address counter unit 53 which is used to supply an address for memory scrubbing purposes. The selected address bits identify four adjacent 32-bit data words when four data words are to be read from memory location on sequential processor cycles. Other selected bits are used to determine which of the four bytes of a 32-bit word are being referenced at any particular time.

In a memory scrubbing operation the scrubbing address generator is the address counter 53 which is programmed to scan through every address in all four quadrants of the shared memory. The counter can also be designed to skip the memory locations in the memory regions defined for use in single source data exchanges, as discussed above, since these locations should not be scrubbed. The scrubbing source address counter is used as the address source when the following conditions are met:

1. A processor is completing a read of either a single location or multiple locations on commonly sourced data outputs from multiple sources, as opposed to a single source data output.
2. A scrubbing regulator has approved the scrubbing operation.

A scrubbing regulator prevents the scrubber from interfering significantly with the throughput of the processor. The regulator can use a counter for counting the number of fault tolerant clock (FTC) cycles following a scrub cycle and actuate a scrub cycle operation only after a specified number of FTC cycles have occurred. In this way, the frequency of the scrubbing operation can be automatically regulated by selecting such specified number of FTC cycles, so that the frequency thereof is adjustable as pre-selected by a user to produce a desired trade-off for any particular operation between obtaining transient system reliability (using a high scrub rate) without severely reducing the system throughput (using a low scrub rate).

An address pipeline contains the addresses of the data objects which are passing through during a common source data read pipeline. The address and data pipelines are of equal length, and are designed so that the address at the end of the pipeline corresponds to the data object at the end of the data read pipeline. If the syndrome of the data object is non-zero, indicating that the decoder has detected errors in the received code word, the syndrome is recorded by a syndrome register and the address at the end of the address pipeline is recorded by a syndrome address register. The contents of these registers can be used by suitable and well known fault-detection and isolation diagnostic software to determine if the system contains any faults. Since different FCRs may see different syndromes, when performing such operation the contents of the syndrome registers must be exchanged using the source congruency operation as described above with reference to FIG. 6A.

Figure 8:
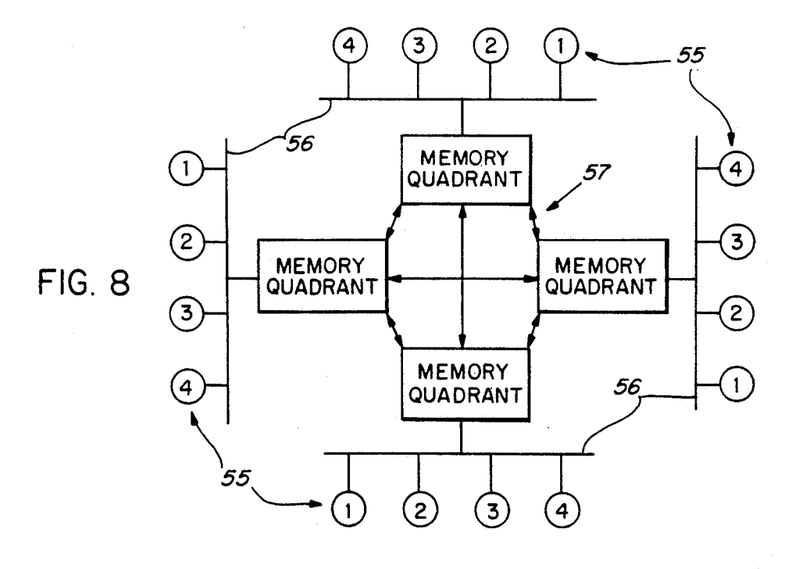
FIG. 8 shows a block diagram of a system of the invention using multiple processors in a fault containment region.

While the above embodiment is described for FCRs using a single processor in each, it is clear that multiple processor sites can be used in each FCR which processors can each access the shared memory system, as shown in FIG. 8. The processor sites 55 are arbitrarily grouped into quadrupled redundant processing groups, e.g., those designated "1" in each FCR forming one group. Those designated "2" forming another group, etc. Each group submits to a suitably designed clock deterministic arbitration scheme to determine priority of access to a shared bus 56 connecting the processors to the shared memory 57. Such a bus arbitration scheme must be synchronous with the fault-tolerant clock, i.e., arbitration signals must change state on the same processor clock cycle in all FCRs. Most conventional arbitration schemes known to the art can be readily adapted for use for such purpose so that the fault tolerant clock synchronous constraint is satisfied. One such arbitration scheme, for example, is described with reference to a well-known VMEbus configuration in the manual "VMEbus Specification, Rev. c. 1, compiled and edited by Micrology pbt, Inc., Printex Publishing, Inc., October 1985.

The use of multiple processors enhances system performance and can also improve reliability since the arbitrary grouping of redundant groups would allow the inclusion of spare units (either processors, memory or I/O devices) in each FCR. As more redundant processor groups are present on the shared bus, contention for access thereto increases and, while theoretically no limitation on such number exists, a practical limitation on the number of processors, perhaps no more than three or four, appears preferable.

While the above described embodiments of the invention represent preferred embodiments thereof, modifications thereto may occur to those in the art within the spirit and scope of the invention. Hence, the invention is not to be construed as limited to the specific embodiments disclosed except as defined by the appended claims.

What is claimed is:

1. A fault tolerant data processing system for providing single fault Byzantine resilience, said system comprising:
   a plurality of fault containment regions each region including at least one processing element;
   a shared memory, each fault containment region further including a portion of said shared memory, the shared memory portion in each fault containment region providing communication with the shared memory portions of each other said fault containment region;
   each shared memory portion in a fault containment region including
   encoding means responsive to a data byte from the processor in said fault containment region for encoding said data byte into a plurality of data byte symbols representing said data byte, a selected number of said data byte symbols being usable to reconstruct said data byte;
   storage means for storing encoded data byte symbols in said shared memory portion;
   transmitting means for transmitting encoded data byte symbols to one or more of the other shared memory portions in other fault containment regions;
   receiving means for receiving encoded data byte symbols from one or more of said other shared memory portions; and
   decoding means responsive to data byte symbols for decoding said symbols to reconstruct a data byte represented thereby.

2. A fault tolerant data processing system in accordance with claim 1 wherein said system includes four fault containment regions each having a memory quadrant of said shared memory and wherein said encoding means responds to a data byte for encoding said data byte into four data byte symbols, any three of which are usable to reconstruct said data byte, said system performing a data byte write operation when a data byte is supplied from a processing element of one of said fault containment regions wherein
   the encoding means of the shared memory quadrant of said one fault containment region responds to said data byte to encode said data byte into four data byte symbols, $N_0$, $N_1$, $N_2$ and $N_3$;
   the storage means of the shared memory quadrant of said one fault containment region stores the $N_0$ data byte symbol and the transmitting means of the shared memory quadrant transmits the $N_1$, $N_2$ and $N_3$ data byte symbols to different ones of the other three shared memory quadrants the other ones of said fault containment regions, respectively; and
   the receiving means of each of said other three shared memory quadrants receives its respective data byte symbol and stores said received data byte symbol in its storage means.

3. A fault tolerant data processing system in accordance with claim 2 for providing a data byte read operation when a data byte symbol $N_o$ of a data word to be read is supplied from a source shared memory quadrant of one of said fault containment region wherein
   the transmitting means of the shared memory quadrant of said one fault containment region transmits said data byte symbol $N_o$ to each of the other three shared memory quadrants of the other fault containment regions;
   the receiving means of each of said other three shared memory quadrants receive said data byte symbol $N_o$ and the transmitting means thereof re-transmits said received data byte symbol $N_0$ to the shared memory quadrants of all of said fault containment regions;
   the receiving means of each shared memory quadrant receives the data byte symbols $N_0$ from each of said other three memory quadrants, respectively, and supplies said received data byte symbols to its voter means for providing a voted $N_o$ data byte symbol output therefrom;
   the transmitting means of said other three shared memory quadrants transmits the data byte symbols $N_1$, $N_2$ and $N_3$, respectively, representing the data byte to be read, to all said shared memory quadrants.
   each shared memory quadrant supplying the data byte symbols $N_1$, $N_2$, $N_3$ received from said other three memory quadrants and the voted $N_0$ data byte symbol from its voter means to its decoding means for decoding the voted $N_0$ data byte symbol and the received data byte symbols $N_1$, $N_2$ and $N_3$ to reconstruct therefrom the data byte read from said shared memory.

4. A fault tolerant data processing system in accordance with claim 3 wherein the transmitting of the data byte symbol $N_0$ from the source shared memory quadrant to all of said shared memory quadrants and the transmitting of the shared data byte symbols $N_1$, $N_2$ and $N_3$ from said other three shared memory quadrants to all said shared memory quadrants are performed simultaneously.

5. A fault tolerant data processing system in accordance with claims 1, 2, 3 or 4 and further including
   memory error detection and correction means for sequentially scanning memory locations in the shared memory portions of said shared memory and connecting transient errors at said locations; and
   means for periodically actuating said memory error detection and correction means.

6. A fault tolerant data processing system in accordance with claim 5 and further including means for regulating the periodic actuation of said memory error detection and correction means.

7. A fault tolerant data processing system in accordance with claim 6 wherein said regulating means includes fault tolerant clock means for controlling the timing of the operation of said system in accordance with a selected fault tolerant clock cycle;

means for counting the number of fault tolerant clock cycles following the completion of a sequential scanning of said memory locations by said error detection and correction means; and means for actuating said error detection and correction means to begin a subsequent sequential scanning of said memory locations after a specified number of fault tolerant clock cycles have been counted by said counting means.

* * * * *